INVENTOR.
MELIUS SERNIUK

ATTORNEYS

United States Patent Office 3,447,400
Patented June 3, 1969

3,447,400
SPEED CONTROL APPARATUS
Melius Serniuk, 4011 Bardaguera Place,
Bonita, Calif. 92002
Filed June 30, 1967, Ser. No. 650,341
Int. Cl. F16h 3/44
U.S. Cl. 74—782          1 Claim

ABSTRACT OF THE DISCLOSURE

A speed control apparatus comprising a housing which supports a drive shaft carried coaxially within a hollow driven shaft. A sun gear is disposed adjacent the end of the drive shaft and is mounted on a shaft which drives a reversible hydraulic pump. An internally toothed ring gear is arranged concentrically with the sun gear and a plurality of pinions are drivingly interposed between the sun gear and ring gear and are carried by a carriage driven by the drive shaft.

---

Figure 2:
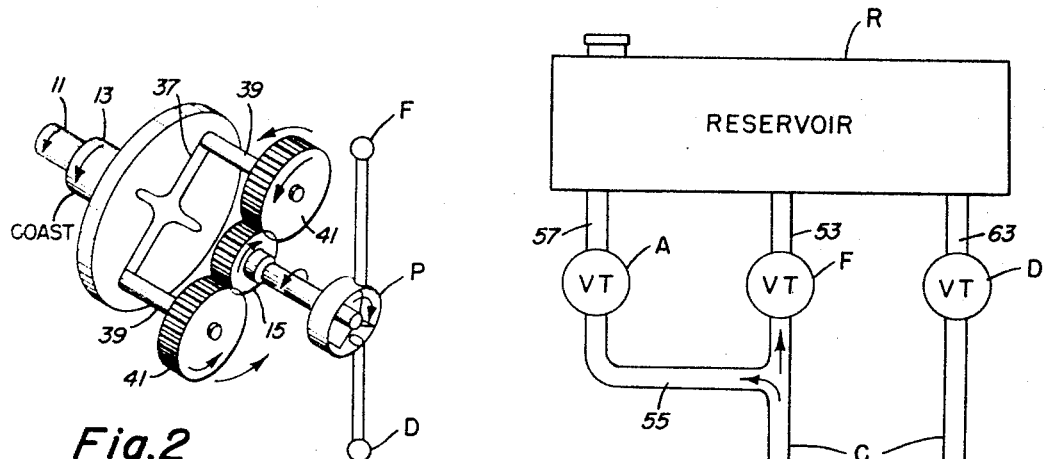

The opposite sides of the pump are connected with a hydraulic fluid reservoir by respective first and second conduits and associated first and second control valves, whereby rotation of the sun gear in either direction can be resisted by manipulation of the selected first or second valves to control the speed of the driven shaft relative to the drive shaft.

The present invention relates generally to speed control apparatus and more particularly to a compact tarnsmission for varying the speed of the output shaft relative to the speed of the input shaft.

Some of the known control devices provide relative control between the input and output shafts in the forward direction but none of such devices provide for preventing over rotation of the output shaft relative to the input shaft.

Accordingly, it is an object of this invention to provide a control apparatus including an epicyclic gear train which includes a driven shaft supporting a ring gear which is drivingly connected with a sun gear by a plurality of pinions. The pinions are carried by a carriage which drives the driven shaft.

The sun gear drives a reversible hydraulic pump and flows in opposite directions through the pump is selectively controlled by a pair of control valves. Thus, when the drive shaft is operating and it is desirable to increase the output speed, one control valve is partially closed to load the pump and rotation of the sun gear in one direction is slowed to correspondingly increase the ring gear rotation. Alternatively, when the driven shaft is coasting faster than the drive shaft, the other valve can be partially closed to slow the sun gear and brake the drive shaft.

Other features and the advantages of the present invention will be apparent from the following description, reference being had to the accompanying drawing wherein a preferred embodiment of the invention is illustrated.

Figure 1:
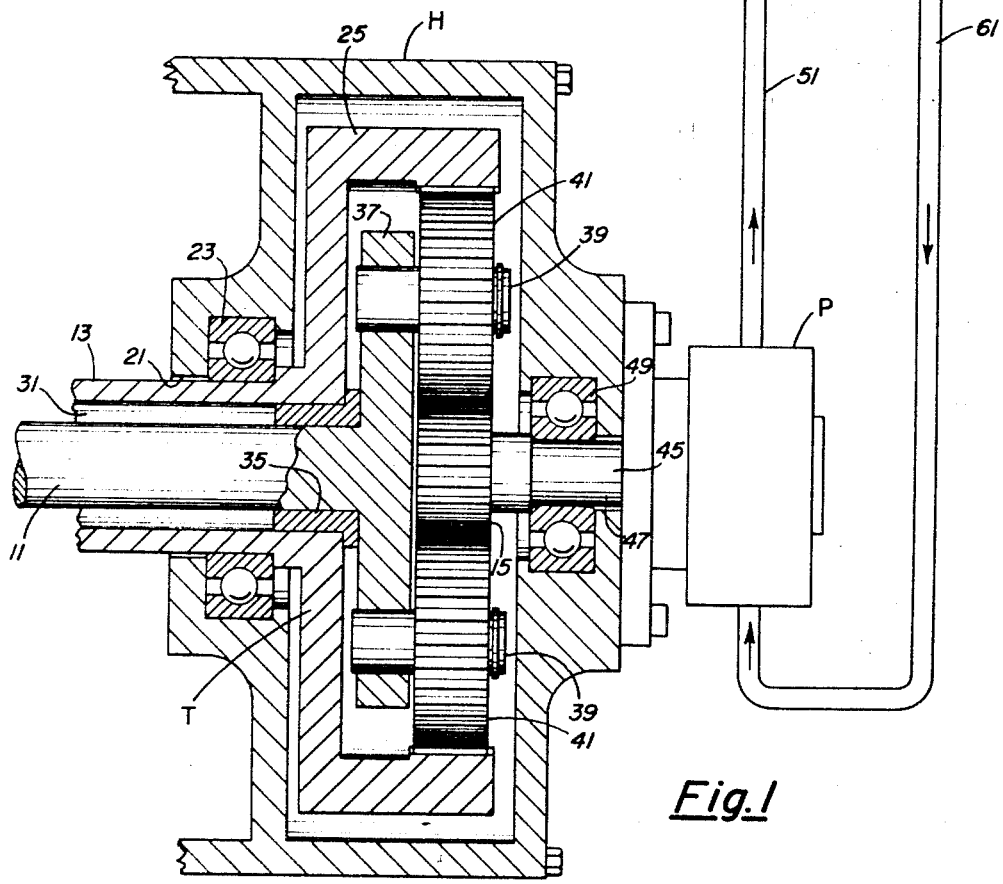

In the drawing:

FIG. 1 is a vertical sectional view of an epicyclic gear train and schematic of an accompanying hydraulic system embodying the present invention; and FIG. 2 is a schematic view of the apparatus shown in FIG. 1.

The speed control device of the present invention includes an epicyclic gear train T having a drive shaft 11 and a driven shaft 13. The gear train T includes a sun gear 15 that drives a reversible hydraulic pump P. The pump P is connected with a hydraulic fluid reservoir R by conduit circuit C and flow through the conduit is controlled by a forward control valve F and drag control valve D.

Referring more in detail to the drawing, the speed control apparatus includes a housing H which has a horizontal bore 21 opening to the left for receiving the hollow driven shaft 13. The driven shaft 13 is supported in a roller bearing assembly 23 and is conveniently formed integrally with an internally toothed ring gear 25. The driven shaft 13 includes an axial passage 31 for receiving the drive shaft 11 which is supported on its extremity by a bronze bushing 35. A planet spider or carriage 37 is carried on the end of the drive shaft 11 and carries a plurality of planetary gear shafts 39. The shafts 39 rotatably carry planetary gears 41 which are drivingly interposed between the sun gear 15 and the internally toothed ring gear 25.

The sun gear 15 is fixed to the end of a drive shaft 45 extending from the pump P. The drive shaft 45 is reduced in diameter at 47 and is received in and carried in a ball bearing assembly 49.

The conduit circuit C includes a conduit 51 which is connected on one end with the pump P and on the opposite end with the inlet of the forward flow control valve F. The outlet of the flow control valve is connected with the reservoir R by a conduit 53 of circuit C. A conduit 55 is connected with the conduit 51 and connects with the inlet of a fine adjustment valve A, and the outlet of the adjustment valve A is connected with the reservoir R by a conduit 57. The lower side of the pump P, as viewed in FIG. 1, is connected with the outlet of the drag valve D by a conduit 61. The inlet of the drag valve D is connected with the reservoir R by a conduit 63.

From the foregoing, and with reference to FIG. 2, it will be clear that when the input shaft 11 is connected with a prime mover and is driven in a counterclockwise direction, as viewed in FIG. 2, to rotate the planetary gears 41 around the periphery of the ring gear 25, and the sun gear 15 is allowed to rotate freely, the planetary gears 41 will rotate in a clockwise direction. Since the sun gear 15 is free to rotate there will be no driving force exerted on the ring gear 25 and the sun gear will merely rotate counterclockwise and drive the pump P in a like counterclockwise direction pumping hydraulic fluid out through the conduit 51 and valves F and A.

Rotation of the driven shaft 13 can be commenced by closing either of the valves A or F. The valve F is sized to have a relatively high flow capacity and can be closed rapidly. Thus, when the control apparatus is installed in an automobile, the automobile can be brought rapidly up to the general speed range desired by closing the valve F. Thereafter, further control can be effected by adjusting the valve A. Gradual closing of the valve F will gradually increase the resistance to flow from the pump P thereby resisting turning of the sun gear 15 and exerting resistance against the counterclockwise rotation of the planetary gears 41 and urging clockwise rotation of the ring gear 25. As the sun gear 15 is gradually slowed, rotation of the planetary gears 41 will be likewise slowed until they no longer rotate around their shafts 39, and the ring gear 25 and sun gear 15 turn as a unit. Further braking of the sun gear 15 will commence the planetary gears 41 rotating in a counterclockwise direction, thus causing the ring gear 25 to rotate more rapidly than the input shaft 11. When the sun gear 15 is completely stopped, the driven shaft 13 will be operating at its maximum r.p.m. for the particular engine speed.

When the automobile in which the speed control device is installed is coasting downhill at a faster rate than the corresponding engine speed, a counterclockwise torque will be exerted on the normally driven shaft 13 and it will act as a drive shaft. Consequently, the ring gear 25 will be driven in a counterclockwise direction, thus tending to rotate the planetary gears 41 in a counterclockwise direction around their respective shafts 39. When the normally driven shaft 13 overtakes and rotates faster in such counterclockwise direction than the drive shaft 11, the planetary gears 41 will be driven in the counterclockwise direction and will drive the sun gear 15 in a clockwise direction, thus reversing the pump P from its normal direction of rotation. With the pump P reversed, the drag valve D can be closed, either partially or totally, to exert the desired amount of engine (not shown) drag on the driven shaft 11 to slow the automobile (not shown).

From the foregoing it will be clear that the speed control device of this invention is compact, and has a substantial range of speed control. It will also be clear that there is infinitesimal control over the entire control range and that, in addition, the control device will provide extremely accurate control over the range influenced by the fine adjustment valve A. Further, the drag valve D enables the drive wheels of the automobile to be coupled with the engine to thereby utilize engine drag to slow the automobile. The particular construction of the interfitting drive shaft 11 and driven shaft 13 is especially convenient for use in automobiles where the engine is disposed directly over the drive wheels.

Various modifications and changes may be made with regard to the foregoing detailed description without departing from the spirit of the invention or the scope of the following claims.

I claim:
1. A speed control apparatus, comprising in combination:
(A) a drive shaft;
(B) a housing, said shaft extending into the housing;
(C) an epicyclic gear train in the housing, said gear train including:
  (1) a carriage drivingly connected with the shaft,
  (2) a sun gear,
  (3) a plurality of pinions carried by the carriage and surrounding and engaging the sun gear,
  (4) a ring gear, mounted concentrically with the drive shaft and having surrounding engagement with the pinions;
(D) a driven shaft connected with the ring gear;
(E) a reversible hydraulic pump;
(F) a shaft connecting the sun gear and the pump;
(G) a reservoir;
(H) a first conduit connecting said reservoir with one side of said pump;
(I) a first valve for controlling flow through said conduit, in one direction from said pump;
(J) a second conduit connecting the opposite side of said pump with said reservoir;
(K) a second valve for controlling flow through said second conduit, in the opposite direction from said pump;
(L) a third conduit connecting the first mentioned side of said pump with said reservoir;
(M) a third valve for controlling flow through said third conduit, said first mentioned valve having a relatively high flow capacity and said third mentioned valve having a realtively low flow capacity.

References Cited

UNITED STATES PATENTS

| | | | |
|---|---|---|---|
| 2,343,509 | 3/1944 | Jandasek | 74—782 |
| 2,390,626 | 12/1945 | Szekely | 74—782 X |
| 2,692,513 | 10/1954 | Hattan | 74—790 X |
| 3,240,083 | 3/1966 | Stoddard | 74—782 X |

FOREIGN PATENTS

| | | |
|---|---|---|
| 294,785 | 8/1928 | Great Britain. |
| 1,034,911 | 4/1953 | France. |

ARTHUR T. McKEON, *Primary Examiner.*